United States Patent
Silverman (10) Patent No.: US 6,975,491 B2
(45) Date of Patent: Dec. 13, 2005

(54) ELECTRICAL GROUND PROTECTION DEVICE AND METHOD

(76) Inventor: Arthur A. Silverman, 2245 Harmain Rd., Pittsburgh, PA (US) 15235

( * ) Notice: Subject to any disclaimer, the term of this patent is extended or adjusted under 35 U.S.C. 154(b) by 236 days.

(21) Appl. No.: 10/269,482

(22) Filed: Oct. 11, 2002

(65) Prior Publication Data

US 2004/0070896 A1 Apr. 15, 2004

(51) Int. Cl.[7] .................................... H02H 3/00
(52) U.S. Cl. ........................................ 361/42
(58) Field of Search ........................ 361/42, 54, 88

(56) References Cited

U.S. PATENT DOCUMENTS

| | | | |
|---|---|---|---|
| 3,810,003 A | 5/1974 | Portoulas | 324/51 |
| 3,967,195 A | 6/1976 | Averitt et al. | 324/51 |
| 4,707,759 A | 11/1987 | Bodkin | 361/48 |
| 4,843,514 A | 6/1989 | Bodkin | 361/50 |
| 4,929,887 A | 5/1990 | Robitaille et al. | 324/66 |
| 5,606,480 A | 2/1997 | Nevo | 361/46 |
| 5,754,114 A | 5/1998 | Gnadt | 340/649 |
| 5,973,896 A * | 10/1999 | Hirsh et al. | 361/54 |
| 6,023,400 A | 2/2000 | Nevo | 361/42 |
| 6,072,317 A | 6/2000 | Mackenzie | 324/536 |
| 6,437,951 B1 * | 8/2002 | Ahlstrom et al. | 361/42 |

* cited by examiner

Primary Examiner—Stephen W. Jackson
Assistant Examiner—Boris Benenson
(74) Attorney, Agent, or Firm—Metz Lewis LLC; Barry I. Friedman (57) ABSTRACT

An apparatus and method for protecting against electrocution hazards that arise when an appliance is electrically connected to a miswired single-phase AC electrical source are described. Protection is provided against miswiring conditions that cause the putative ground line of the electrical source to be either electrically energized or to be electrically open. The apparatus includes one or more sensors that detect if the electrical source is miswired and operate one or more switches which preclude electrical continuity to one or more of the electrical lines of the appliance if a miswiring is detected. The method includes the steps of detecting if the putative ground of the electrical source is electrically energized, and if it is, then precluding electrical continuity between the putative ground of the electrical source and the ground of the appliance.

26 Claims, 4 Drawing Sheets

ELECTRICAL GROUND PROTECTION DEVICE AND METHOD

BACKGROUND OF THE INVENTION

1. Field of the Invention

The present invention relates to an apparatus and method for providing protection against an electrocution hazard in an appliance arising from a miswiring condition in an electrical source that is to electrically supply the appliance. In particular, the present invention provides such protection where the putative ground line of the electrical supply is improperly electrically charged or is not properly connected.

2. Description of the Related Art

Modern single-phase, alternating current (AC) electrical wiring employs a three wire or line configuration. A first wire is an ungrounded conductor that is commonly referred to as the "hot" wire. A second wire is a grounded conductor that is commonly referred to as the "neutral" wire. The third wire is a grounding conductor that is commonly referred to as the "ground" wire. The ground wire is typically a bare wire, whereas the hot and neutral wires are sheathed in color-coded insulation, the hot wire insulation typically being black and the neutral wire insulation typically being white.

Despite these conventions, miswirings occur with alarming frequency, especially where the wiring has been installed by an inexperienced person, such as a homeowner. A miswiring may occur at an electrical outlet, at the electrical panel to which the electrical outlet is connected, or somewhere between the electrical outlet and the electrical panel, for example, at a switch or at a connection or work box. The miswiring may consist of the swapping of two or all three of the wires, a failure to connect a wire properly, or the omission of a wire.

Simple testing devices which plug into an electrical outlet can be used to determine if an electrical outlet is correctly wired. An example of such a tester is described in U.S. Pat. No. 3,967,195 to Averitt et al. issued Jun. 29, 1976, which is incorporated herein by reference. These testing devices typically employ the various on-off lighting combinations of a set of three lights to indicate whether the electrical outlet is correctly wired or if wires have been switched or are unconnected. However, the same inexperience or incorrect installation work that causes an electrical outlet to be incorrectly wired in the first place may also result in the failure to test the electrical outlet for correctness. Even when an electrical outlet is tested for correct wiring upon installation, later changes to the wiring in the electrical panel or in work boxes between the electrical outlet and the electrical panel can result in the electrical outlet being effectively miswired.

The most common miswiring condition is the swapping of the two insulated wires, that is, the hot and neutral wires. Due to the nature of single-phase AC power, many lamps and appliances plugged into an electrical outlet in which the hot and neutral wires have been swapped will operate, nonetheless. However, if the lamp or appliance is not double-insulated or is not grounded, for example, by a grounding wire of the lamp or appliance being electrically connected to the ground wire terminal of the electrical outlet, the lamp or appliance could be an electrocution hazard for a person who comes into simultaneous contact with the lamp or appliance and a true electrical ground. The availability of ground fault interrupter devices, as are well known in the art, has reduced the frequency of injuries resulting from this problem. However, the use of ground fault interrupter devices on electrical outlets is far from universal and the ground fault interrupter devices themselves must be periodically checked to determine if they are in working order.

A much less common, but potentially lethal, electrical miswiring problem is the swapping of the hot wire and the ground wire. This results in the ground blade receptacle of the electrical outlet being electrically hot. Appliances and lamps plugged into an electrical outlet in which the hot and ground wires have been swapped will not operate. Although this inoperativeness signals that a problem exists, it does not identify what the problem is. The user may initially misdiagnose the problem as being with the appliance or electrical panel or an intermediate switch rather than with the electrical outlet. However, the user may be electrocuted before he discovers the true cause of the problem or even the fact that a problem exists. The grounding wire on the appliance or lamp side of the electrical outlet is typically attached to the portions of the appliance or lamp with which the user can be expected come into contact, which for simplicity of expression are referred to herein as the housing of the appliance or lamp. A grounding wire properly connected to the housing is intended to shunt any voltage leaking to the housing to an electrical ground through the ground wire. When the ground wire of the electrical outlet is correctly wired, this arrangement prevents a dangerous voltage difference from existing between the housing and electrical ground voltage and so protects a user from being electrocuted who simultaneously comes in contact with the housing and an electrical ground.

However, where the hot and ground wires have been swapped in an electrical outlet, the ground wire becomes electrically energized or live with the AC voltage the hot wire was intended to have, for example, 120 VAC. This causes the ground wire of an appliance or lamp plugged into such an electrical outlet to conduct this high voltage potential to the housing of the appliance or lamp. Anyone who comes into simultaneous contact with the electrified housing of the appliance or lamp and an electrical ground may be electrocuted. This hazard is particularly acute where the appliance or lamp is one that is intended for use in or near water, for example, water pumps, drain cleaners, and certain work lamps.

Moreover, it is also possible for an electrical outlet to have an electrically energized ground wire connected to its ground blade receptacle, but have no connections to the blade receptacles that are normally connected to the hot and neutral wires. In such a case, none of the lights of a common three-light tester will light, thus suggesting that either the hot wire is not connected in the electrical outlet or that there is no power to the electrical outlet, for example, because the power has been disconnected by a breaker, fuse or switch or that the electrical outlet has not yet been wired. Nonetheless, unless the person making the test takes immediate action to correct the problem or to post some kind of warning against use of the electrical outlet, a second person having no knowledge of the test may attempt to use the electrical outlet with deadly results.

The omission of a ground wire connection to an electrical outlet also presents an electrocution hazard. For instance, where the ground receptacle of an electrical outlet is not electrically connected to a ground line, any electrical short between the hot wire and the ground receptacle may result in the ground receptacle becoming electrically energized. Although a fuse or circuit breaker usually protects against electrical shorts, there is no protection in this case because the absence of a ground line connection prevents there from being any current flow due to the electrical short until a person or some other conductor completes the circuit to ground and then it may be too late. Such an electrical short may occur if an uninsulated portion of the hot wire comes into contact with either a portion of the ground receptacle or, where the electrical box containing the electrical outlet is metal, any portion of the electrical box. This might happen, for example, if an insulating wire nut connector on the hot wire gets dislodged when the wires are pushed back into the electrical box during the installation of the electrical outlet or if too much insulation was stripped away from the end of the hot wire to make a connection leaving a portion of the hot wire exposed. Where the electrical box is metal, it too may become electrically energized under these circumstances.

Additionally, where there is no shorting of the hot wire to the neutral receptacle, the omission of a ground wire connection to the electrical outlet is a particularly insidious problem because the person who plugs an appliance or lamp having a three-prong plug into an electrical outlet having a three-prong receptacle expects that the electrical outlet will electrically ground the appliance or lamp. Where the ground wire in the electrical outlet is missing or unconnected, the sense of security the user gets is not only false, but is potentially lethal.

What is lacking in the art, therefore, is a device which protects against the electrocution hazard caused by an electrical outlet having an electrically energized ground blade receptacle, while permitting the appliance or lamp to be electrically connected to the ground line of the electrical outlet into which it is plugged when the electrical outlet is properly wired. Ground fault interrupter devices do not provide protection against this condition because they operate by looking for an imbalance in the current flows between the hot and neutral wires and do not monitor the ground wire. U.S. Pat. No. 5,754,114 to Gnadt issued May 19, 1998, U.S. Pat. No. 5,606,480, to Nevo, issued Feb. 5, 1997, and U.S. Pat. No. 4,843,514, to Bodkin issued Jun. 27, 1989, all of which are incorporated herein by reference, disclose devices that break the connections in the hot and neutral lines to the appliance or lamp when a miswiring condition is detected. However, such devices do not protect against the housing of the appliance or lamp becoming an electrocution hazard when the appliance or lamp is connected to an electrical outlet having an electrically energized ground blade receptacle. U.S. Pat. No. 6,023,400 to Nevo, issued Feb. 8, 2000, which is incorporated herein by reference, discloses a device that employs a virtual ground. Although this device provides protection against an electrical outlet having an electrically hot ground wire receptacle, it does so at the cost of totally eliminating any electrical connection between the ground line of the electrical outlet and that of the appliance or lamp, even when the electrical outlet is properly wired.

Thus, there is a need for a device that provides protection against the electrocution hazard that is caused by an electrical outlet having an electrically energized ground blade receptacle, or more generally, by a miswired electrical source in which the putative ground line is electrically energized.

SUMMARY OF THE INVENTION

The present invention provides a device that protects against the electrocution hazard that is caused by a ground blade receptacle of an electrical outlet being electrically energized. Some embodiments of the invention also provide protection against the electrocution hazards that are caused by not connecting a proper ground wire to the ground blade receptacle of an electrical outlet, that is, where the ground blade receptacle is electrically open. Some embodiments of the present invention also protect against the electrocution hazards that are caused by the switching of the hot and neutral wires in an electrical outlet. More generally, the present invention protects a person who comes into contact with an electrical appliance or lamp from electrocution hazards that are incident to miswiring the electrical source to which the appliance or lamp is electrically connected, especially where that miswiring results in the putative ground wire of the electrical source being electrically charged.

Some embodiments of the present invention take the form of a device that is incorporated into an electrical outlet. Other embodiments take the form of an interface that plugs into an electrical outlet and which receives the plug of an appliance or lamp. Still other embodiments take the form of a device that is incorporated into the plug or into the power cord of an appliance or lamp. Other embodiments take the form of a device that is incorporated integrally into an appliance or lamp.

In addition to providing protection against electrocution, some embodiments include a wiring condition indicator, for example, indicator lights or other displays or information outputs that provide information on the wiring condition of the electrical source that is to electrically supply the appliance or lamp.

The present invention also provides methods of protecting an individual using or contacting an electrical appliance or lamp from an electrocution hazard that is caused by a miswiring condition of the electrical source which is to electrically supply the appliance or lamp. Of particular concern are miswiring conditions which result in the ground blade receptacle of the electrical outlet into which the appliance or lamp is plugged being electrically energized or not being properly connected.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

FIGS. 1A–1G are schematic drawings illustrating the placement of a protection device according to various presently preferred embodiments of the present invention.

DETAILED DESCRIPTION OF PREFERRED EMBODIMENTS

In this section, some presently preferred embodiments of the present invention are described in detail sufficient for one skilled in the art to practice the present invention.

It is to be understood that in this section and in the appended claims, the term appliance is used in a broad sense to mean all electrically powered devices that are supplied with single-phase AC power and encompasses all electrical loads, including electric lamps. Furthermore, although the primary concern of the inventors is to provide electrocution protection from miswired electrical outlets, they also contemplate embodiments of the present invention which have utility where the appliance is wired directly into an electrical supply system rather than being plugged into an electrical outlet.

Figure 1A:
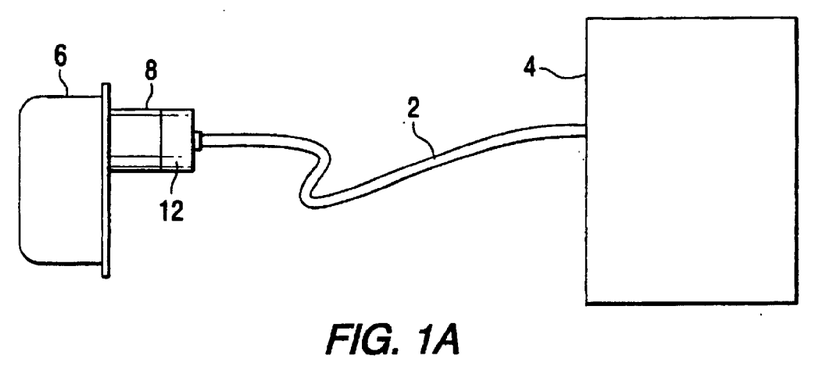
FIG. 1A illustrates an embodiment wherein the protection device is incorporated into the plug of an appliance.
Figure 1B:
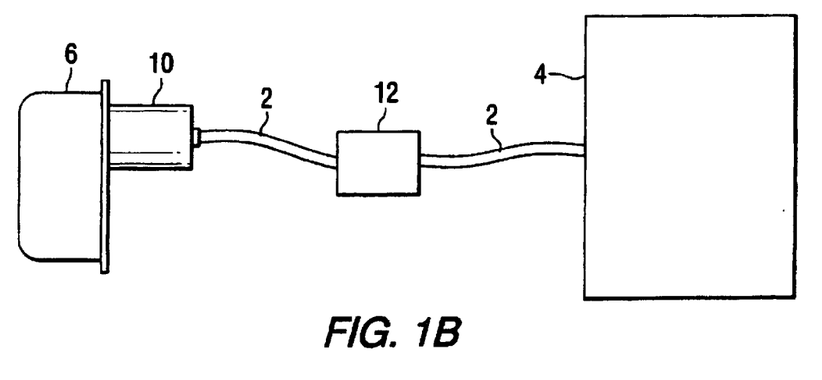
FIG. 1B illustrates an embodiment wherein the protection device is incorporated into the power cord of an appliance.
Figure 1C:
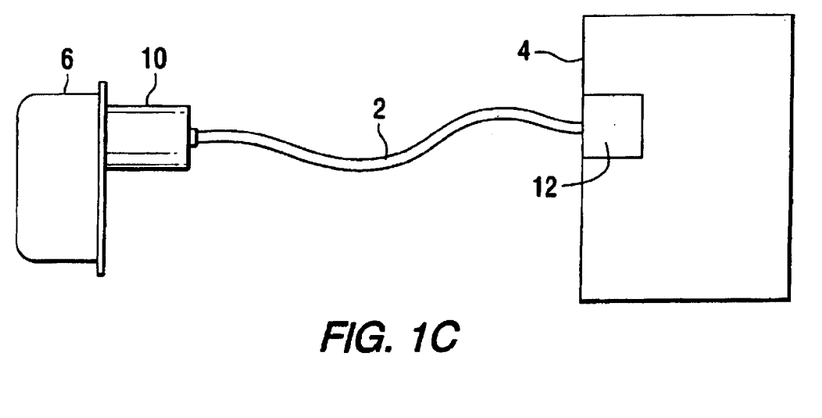
FIG. 1C illustrates an embodiment wherein the protection device is incorporated into an appliance and the power cord of the appliance is plugged into an electrical outlet.
Figure 1D:
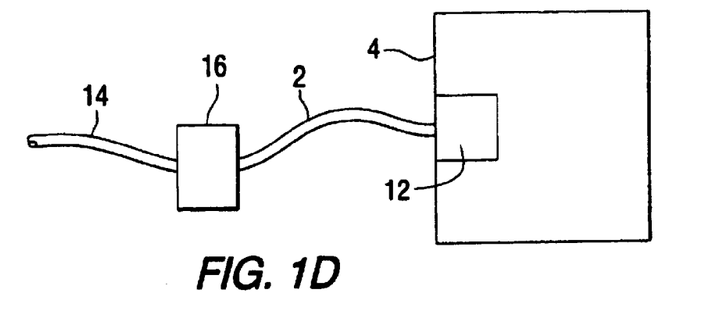
FIG. 1D illustrates an embodiment wherein the protection device is integrally incorporated into an appliance and the power cord is directly connected to the power supply line.
Figure 1E:
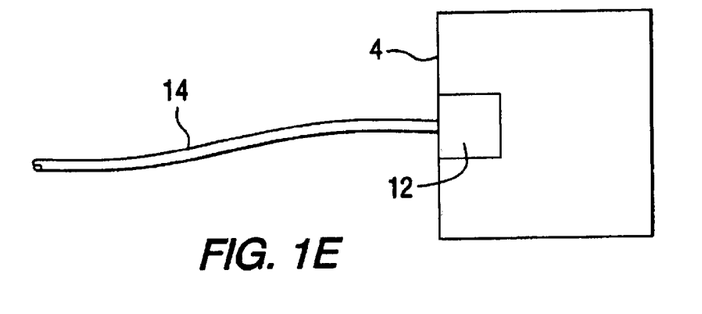
FIG. 1E illustrates an embodiment wherein the protection device is integrally incorporated into an appliance and the power supply line is connected directly to the appliance.

FIGS. 1A–1G schematically illustrate seven basic configurations of embodiments of the present invention. In the first five configurations, the protection device is associated with a particular appliance. Thus, the protection device provides electrocution protection to the user of the appliance no matter what electrical outlet the appliance is plugged into or what power source the appliance is otherwise electrically connected to. Such configurations are particularly preferred when the appliance is portable. Referring to FIG. 1A, the power cord 2 of appliance 4 is plugged into electrical outlet 6 by way of protector plug 8. Protector plug 8 incorporates a protection device 12. Referring to FIG. 1B, the power cord 2 of appliance 4 is plugged into electrical outlet 6 by way of a regular plug 10. In this configuration, a protection device 12 is incorporated into the power cord 2 at some convenient point along the power cord 2. Referring to FIG. 1C, the power cord 2 of appliance 4 is plugged into electrical outlet 6 by way of regular plug 10. In this configuration, a protection device 12 is incorporated into the appliance 4. Referring to FIG. 1D, the protection device again is incorporated directly into the appliance 4. However, instead of being plugged into an electrical outlet, the power cord 2 of the appliance 4 is connected directly to a power source line 14 in a work or connection box 16. Alternatively, referring to FIG. 1E, the power cord 2 may be omitted and the supply line 14 connected directly to the appliance 4 which incorporates a protection device 12.

Figure 1F:
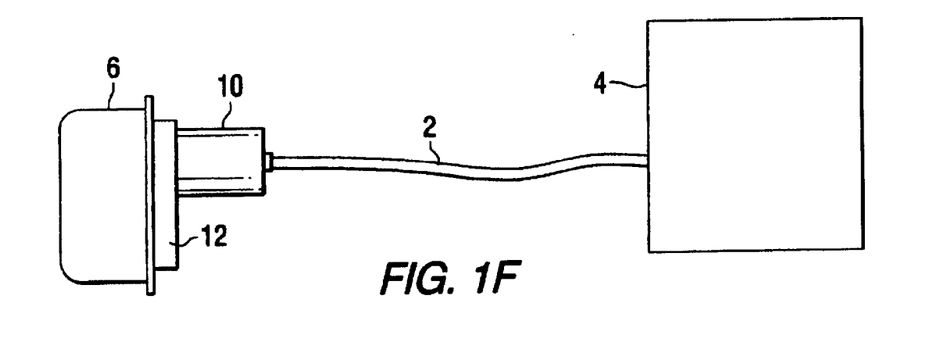
FIG. 1F illustrates an embodiment wherein the protection device is an independent interface that plugs into an electrical outlet and into which the plug of an appliance is plugged.
Figure 1G:
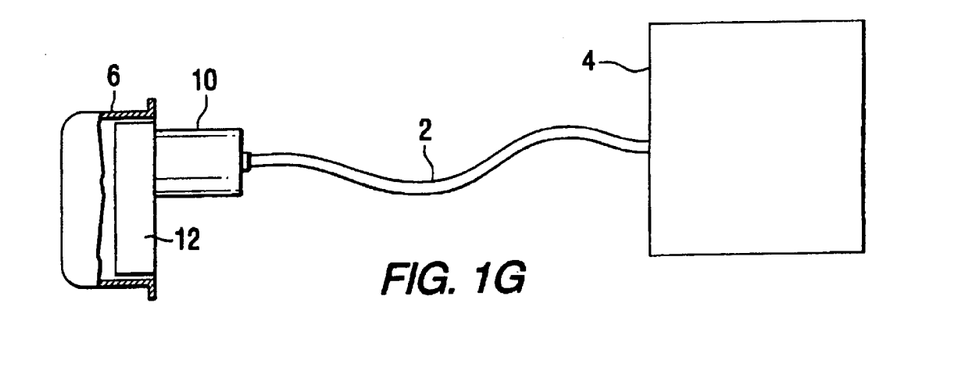
FIG. 1G illustrates an embodiment wherein the protection device is incorporated into an electrical outlet.

In the next two configurations, the protection device 12 is not associated with a particular appliance 4. Referring to FIG. 1F, the power cord 2 of appliance 4 is plugged into an independent, free-standing protection device 12 by way of regular plug 10. Protection device 12 is, in turn, plugged into electrical outlet 6. In this configuration, protection device 12 is a portable interface which may be plugged into any electrical outlet to provide electrocution protection with regard to any appliance or appliances that are powered by that electrical outlet. In contrast, referring to FIG. 1G, the protection device 12 in this configuration is incorporated into electrical outlet 6 to provide electrocution protection with regard to any appliance or appliances, for example, appliance 4, which are plugged into that particular electrical outlet 6.

Figure 2:
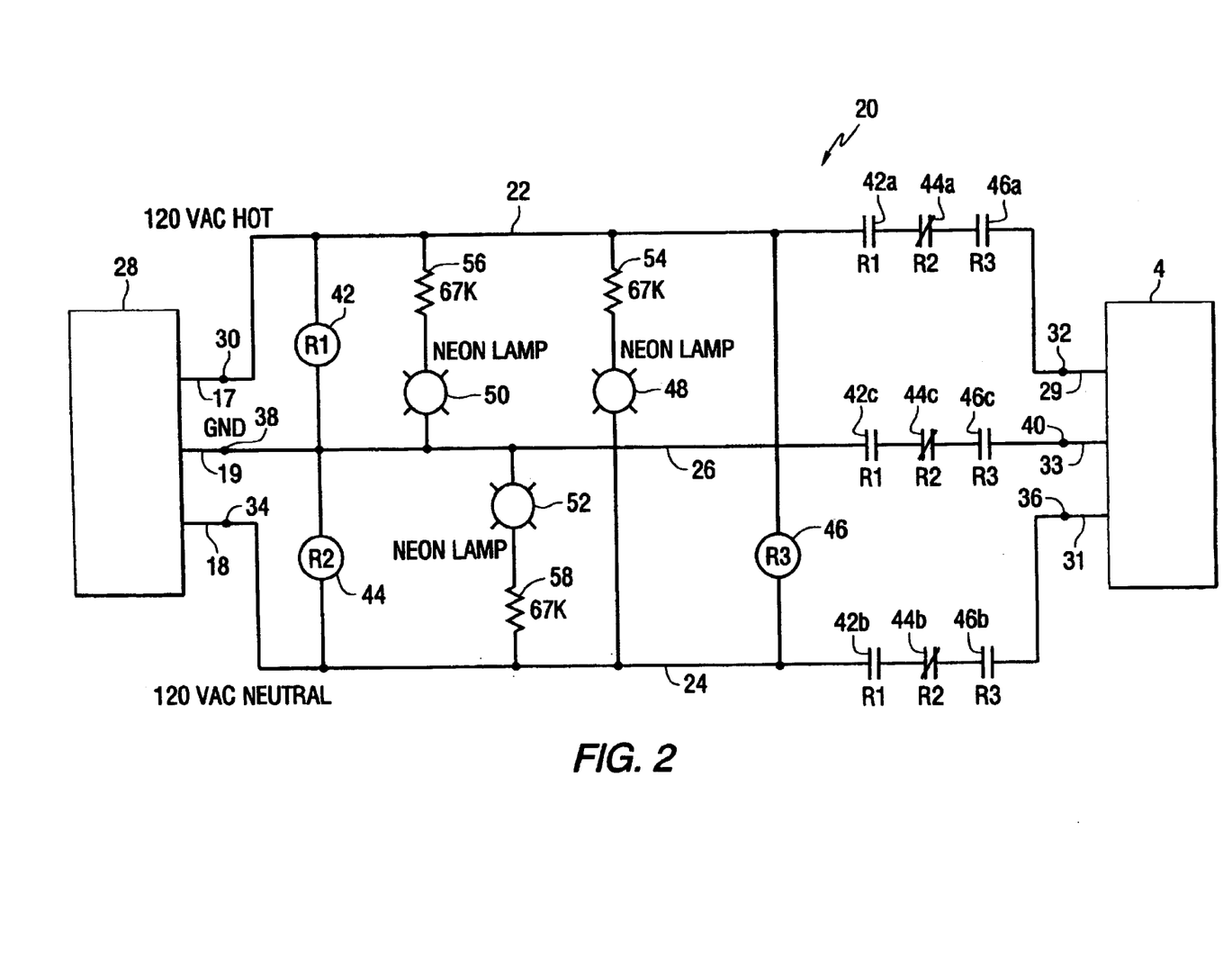
FIG. 2 is an electrical schematic diagram depicting the electrical circuit of a first embodiment.

Referring to FIG. 2, a first electrical circuit 20 of a protection device 12 according to an embodiment of the present invention is schematically illustrated. In some configurations, a separate casing is supplied to contain electrical circuit 20, for example, in the configurations illustrated in FIGS. 1B and 1F. In other configurations, electrical circuit 20 is adapted to be an integral part of another device or component, for example, of an appliance 4, as in FIGS. 1C–1E, of a protector plug 8, as in FIG. 1A, or of an electrical outlet, as in FIG. 1G. The provisions of such casings and the making of such incorporations are within the abilities of those skilled in the art and so are not further described herein.

In operation, protection device 12 is interposed into the electrical path between an electrical source 28 and an appliance 4. Protection device 12 is designed to provide electrical continuity between the electrical source 28 and the appliance 4 if electrical source 28 is correctly wired and to preclude such electrical continuity if electrical source 28 is miswired. Thus, except for the indicator lamps and their respective resistors and connectors, the components of electrical circuit 20 are selected to be of sufficient gauge and conductivity to at least carry the electrical load of the appliance 4 with which the protection device 12 is to be used. In some embodiments, for example, in those embodiments in which the protection device 12 is not associated with a particular appliance 4, the components of the electrical circuit 20 are preferably selected to be safely used with an electrical load magnitude which corresponds to a conventional circuit breaker or fuse amperage level, for example 15 amps or 20 amps, and the protection device 12 may be marked to indicate that amperage level rating so as to indicate that the protection device 12 should be used in a circuit that is load-protected to that amperage level.

The protection device 12 is also sometimes referred to herein as an electrical continuity preclusion apparatus, because protection device 12 precludes electrical conductivity between one or more lines of the electrical source 28 and a corresponding line or lines of an appliance 4 when the protection device 12 detects a miswiring condition in the electrical source 28.

Electrical circuit 20 includes first, second, and third conductance lines 22, 24, 26 which correspond, respectively, to the putative hot, neutral, and ground wires or lines 29, 31, 33 of the appliance 4 and 17, 18, 19 of the electrical source 28. FIG. 2 is notated to reflect a correct wiring condition, although it is to be understood that these labels are being used here only as a conceptual convenience rather than to indicate the actual wiring condition of the electrical source 28. Nonetheless, it is to be understood that all references herein to the hot, neutral, or ground wires of the appliance 4 refer to the wires or lines that one skilled in the art would so designate based upon the design of the appliance 4.

Accordingly, first conductance line 22 has input end 30 that is to be electrically connected to what is expected from electrical wiring convention to be the hot wire of the electrical source 28, that is, to the putative hot wire 17 of the electrical source 28, and an output end 32 that is to be electrically connected to the hot wire 29 of the appliance 4. Second conductive line 24 has an input end or terminal 34 that is to be electrically connected to the putative neutral wire 18 of the electrical source 28 and an output end or terminal 36 that is to be electrically connected to the neutral wire 31 of the appliance 4. Third conductive line 26 has an input end or terminal 38 that is to be electrically connected to the putative ground wire 19 of the electrical source 28 and an output end or terminal 40 that is to be electrically connected to the ground wire 33 of the appliance 4.

Electrical circuit 20 also includes three three-pole double-throw relays, each of which includes a sensing coil and a set of three contact switches which are operated by the sensing coil. A first three-pole double-throw relay includes first sensing coil 42 and normally-open first contact switches 42a, 42b, 42c. First sensing coil 42 is electrically connected across first conductive line 22 and third conductive line 26. First contact switches 42a, 42b, 42c are located, respectively, within first, second, and third conductive lines 22, 24, and 26. In their normally-open condition, first contact switches 42a, 42b, 42c break the electrical continuity of, respectively, first, second, and third conductive lines 22, 24, 26.

A second three-pole double-throw relay includes second sensing coil 44 and normally-closed contact switches 44a, 44b, 44c. Second sensing coil 44 is electrically connected across second conductive line 24 and third conductive line 26. Second contact switches 44a, 44b, 44c, are located, respectively, within first, second, and third conductive lines 22, 24, 26. When normally-closed second contact switches 44a, 44b, 44c are opened by second sensing coil 44 becoming energized by a voltage difference between second and third conductive lines 24, 26, they break the electrical continuity of, respectively, first, second, and third conductive lines 22, 24, 26.

A third three-pole double-throw relay includes third sensing coil 46 and normally-open contact switches 46a, 46b, 46c. Third sensing coil 46 is electrically connected across first conductive line 22 and second conductive line 24. Third contact switches 46a, 46b, 46c are located, respectively, within first, second, and third conductive lines 22, 24, 26. In their normally-open condition, third contact switches 46a, 46b, 46c break the electrical continuity of, respectively, first, second, and third conductive lines 22, 24 26.

Electrical circuit 20 also includes three indicator lights, first, second, and third indicator lights 48, 50, 52 and their associated resistors, respectively, first, second, and third resistors 54, 56, 58. These indicator lights provide a visual indication of whether or not electrical source 28 is correctly wired.

First, second and third indicator lights 48, 50, 52 and their associated resistors 54, 56, 58 are to be selected to be compatible with the nominal voltage of electrical source 28. For example, where electrical source 28 is nominally 120 VAC, each of first, second and third lights 48, 50, 52 may be a 60 V neon lamps and each of first, second and third resistors 54, 56, 58 may be a 67 K, 0.25 watt resistor. The lamps may be used with colored lenses. It is preferred that first and second lamps 49, 50 be used with amber lenses and third lamp 52 be used with a red lens.

First indicator light 48 and first resistor 54 are electrically connected in series between first and second conductive lines 22, 24 so that first indicator light 48 glows if there is a voltage difference between these two conductive lines. Second indicator light 50 and second resistor 56 are electrically connected in series between first and third conducive lines 22, 26 so that second indicator light 50 glows if there is a voltage difference between these two conductive lines. If electrical source 28 is correctly wired, both of these lights will glow. Third indicator light 52 and third resistor 58 are electrically connected in series between second and third conductive lines 24, 26 so that third indicator light 52 glows if there is a voltage difference between these two conductive lines. If the electrical source 28 is correctly wired, third indicator light 52 will not glow because second and third conductive lines 24, 26 will be connected, respectively, to the putative neutral and ground lines 18, 19 of electrical source 28 which are nominally at the same voltage potential. Third indicator light 52 will only glow if electrical source 28 is miswired so that one second and third conductive lines 24, 26 becomes electrically energized with respect to the other.

During the operation of the protection device 12, any of the first, second, and third sensing coils 42, 44, 46 will become energized when a voltage difference exists between the conductive lines to which the particular sensing coil is connected across. Upon being energized, each of first, second, or third sensing coil 42, 44, 46 causes its associated contact switches to reverse position so that normally-open contact switches will close and normally-closed contact switches will open.

For example, if the electrical source 28 is correctly wired, first sensing coil 42 will be energized by the voltage difference between the first conductive line 22 and the third conductive line 26 caused by the voltage difference between the putative hot and ground wires 17, 19 of the electrical source 28. This causes normally-open first contact switches 42a, 42b, 42c to close. Likewise, third sensing coil 46 will be energized by the voltage difference between the first conductive line 22 and the second conductive line 24 caused by the voltage difference between the putative hot and neutral wires 17, 18 of the electrical source 28. This causes normally-open third contact switches 46a, 46b, 46c to close. However, second sensing coil 44 does not become energized because there is no voltage difference between the second and third conductive lines 24, 26 since there is no voltage difference between the putative neutral and the putative ground wires 18, 19 of the electrical source 28, and so normally-closed second contact switches 44a, 44b, 44c remain closed. Thus, when electrical source 28 is correctly wired, all three switches 42a, 44a, 46a are closed in conductive line 22, thereby providing electrical continuity between the putative hot wire 17 of the electrical source 28 and the hot wire 29 of the appliance 4; all three switches 42b, 44b, 46b are closed in conductive line 24, thereby providing electrical continuity between the putative neutral wire 18 of the electrical source 28 and the neutral wire 31 of appliance 4; and all three switches 42c, 44c, 46c are closed in conductive line 26, thereby providing electrical continuity between the putative ground wire 19 of the electrical source 28 and the ground wire 33 of the appliance 4.

However, if the electrical source 28 is miswired, one or more of first, second or third sensing coils 42, 44, 46 may detect a miswiring condition and cause its associated contact switches to preclude electrical continuity between the electrical source 28 and the appliance 4 through first, second, or third conductive lines 22, 24, 26. Table 1 illustrates the various conditions that can exist at the first, second, and third input terminals 30, 34, and 38 of electrical circuit 20 that can exist due to the correct or miswiring of electrical source 28, the resulting open or closed condition of the switches 42a–c, 44a–c, 46a–c and whether the electrical continuity through first, second, and third conductive lines 22, 24, 26 to the first, second, and third output terminals 32, 36, 40 is continuous or broken.

TABLE 1

| Condition Number | First input terminal 30* | Second input terminal 34* | Third input terminal 38* | First sensor coil switches 42a–c | Second sensor coil switches 44a–c | Third sensor coil switches 46a–c | Continuity to first output terminal 32 | Continuity to second output terminal 36 | Continuity to third output terminal 40 |
|---|---|---|---|---|---|---|---|---|---|
| 1 | hot | neutral | ground | closed | closed | closed | continuous | continuous | continuous |
| 2 | hot | ground | neutral | closed | closed | closed | continuous | continuous | continuous |
| 3 | neutral | hot | ground | open | open | closed | broken | broken | broken |
| 4 | neutral | ground | hot | closed | open | closed | broken | broken | broken |
| 5 | ground | neutral | hot | closed | open | closed | broken | broken | broken |
| 6 | ground | hot | neutral | open | open | closed | broken | broken | broken |
| 7 | open | neutral | ground | open | closed | open | broken | broken | broken |
| 8 | open | ground | neutral | open | closed | open | broken | broken | broken |
| 9 | open | neutral | hot | open | open | open | broken | broken | broken |
| 10 | open | hot | neutral | open | open | open | broken | broken | broken |
| 11 | open | hot | ground | open | open | open | broken | broken | broken |
| 12 | open | ground | hot | open | open | open | broken | broken | broken |
| 13 | hot | open | ground | closed | closed | open | broken | broken | broken |
| 14 | ground | open | hot | closed | closed | open | broken | broken | broken |
| 15 | neutral | open | ground | open | closed | open | broken | broken | broken |
| 16 | ground | open | neutral | open | closed | open | broken | broken | broken |
| 17 | hot | open | neutral | closed | closed | open | broken | broken | broken |
| 18 | neutral | open | hot | closed | closed | open | broken | broken | broken |
| 19 | hot | neutral | open | open | closed | closed | broken | broken | broken |
| 20 | neutral | hot | open | open | closed | closed | broken | broken | broken |
| 21 | hot | ground | open | open | closed | closed | broken | broken | broken |
| 22 | ground | hot | open | open | closed | closed | broken | broken | broken |
| 23 | neutral | ground | open | open | closed | open | broken | broken | broken |
| 24 | ground | neutral | open | open | closed | open | broken | broken | broken |
| 25 | hot | open | open | open | closed | open | broken | broken | broken |
| 26 | open | hot | open | open | closed | open | broken | broken | broken |
| 27 | open | open | hot | open | closed | open | broken | broken | broken |
| 28 | open | neutral | open | open | closed | open | broken | broken | broken |
| 29 | open | open | neutral | open | closed | open | broken | broken | broken |
| 30 | neutral | open | open | open | closed | open | broken | broken | broken |
| 31 | open | open | ground | open | closed | open | broken | broken | broken |
| 32 | ground | open | open | open | closed | open | broken | broken | broken |
| 33 | open | ground | open | open | closed | open | broken | broken | broken |
| 34 | open | open | open | open | closed | open | broken | broken | broken |

*In the columns relating to the input terminals, the term "open" indicates that there is no electrical supply to this terminal. This can occur where the supply line has been omitted or has been left unconnected or there is a break in continuity in the line supplying the terminal. In the columns relating to the switches, the term "open" refers to the position state of the switch.

Condition 1 in Table 1 shows that the electrical circuit 20 allows electrical current to flow through the protection device 12 when the electrical source 28 is properly wired. Table 1 also shows that the electrical circuit 20 permits electrical flow-through in condition 2 where the putative neutral and ground wires 18, 19 of electrical source 28 have been reversed or swapped. Although condition 2 is a miswiring condition, it does not present an electrocution hazard for an appliance 4 which has a ground wire 33 to its housing, because the appliance 4 is still grounded through output terminal 40, albiet through a neutral line, that is putative neutral line 18, of the electrical source 28 instead of through a ground line, that is putative ground line 19, of the electrical source 28. In all other miswirings conditions of the electrical source 28, including those that present electrocution hazards, the electrical circuit 20 precludes any electrical connection of the appliance 4 to the electrical source 28 under the conditions shown. Thus, a protection device 12 incorporating first electrical circuit 20 protects against electrocution hazards resulting from swapped hot and ground wires in electrical source 28 as well as from swapped hot and neutral wires in electrical source 28.

Table 1 also shows that a protection device 12 incorporating electrical circuit 20 provides electrocution hazard protection where the ground wire from the electrical source 28 has been omitted or left unconnected, that is, where the putative ground wire 19 of the electrical source 28 is in the electrically open condition. For example, in condition 19, first sensor coil 42 senses that the putative ground wire 19 of the electrical source 28 is electrically open and causes normally open first contact switch 42a to remain open, thus precluding electrical continuity between the putative hot wire 19 of the electrical source 28 and the hot wire 33 of the appliance 4.

One skilled in the art will recognize an advantage in the second contact switches 44a–c being normally closed switches. The advantage is that all electrical conductivity from the electrical source 28 to the appliance 4 is precluded when one or the other of the putative ground wire 19 or the putative neutral wire 18 of the electrical source 28 is electrically energized.

It is to be understood that there are some electrocution hazards incident to miswiring of the electrical source 28 that may not be protected against by a particular embodiment. Consider, for example, an embodiment shown in FIG. 3 which employs second electrical circuit 60. Second electrical circuit 60 is the same as first electrical circuit 20, except that the three-pole, double-throw relay that comprises third sensing coil 46 and its associated contact switches 46a–c in first electrical circuit 20 has been replaced in second electrical circuit 60 with a single-pole relay having only one normally-open contact switch 62a associated with its sensing coil 62. That contact switch 62a is located in conductive line 26. Table 2 illustrates, in a manner similar to that of Table 1, the effect that various wiring configurations of electrical source 28 have on second electrical circuit 60.

voltmeter displays, computer interfaces, et cetera, which provide an indication of the wiring correctness of the

TABLE 2

Figure 3:
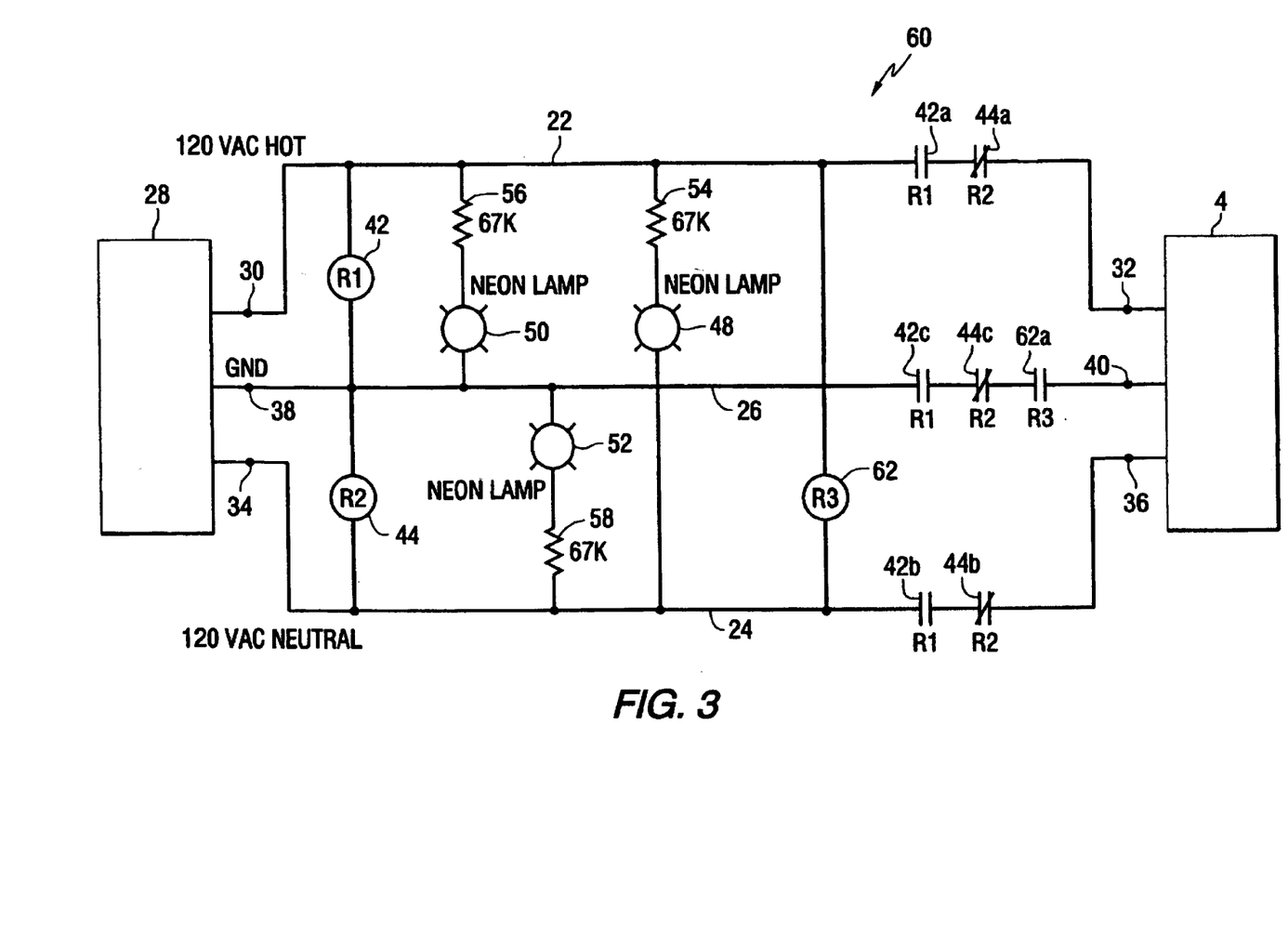
FIG. 3 is an electrical schematic diagram depicting the electrical circuit of a second embodiment.

| Condition Number | First input terminal 30* | Second input terminal 34* | Third input terminal 38* | First contact switches 42a–c | Second contact switches 44a–c | Third contact switch 62a | Continuity to first output terminal 32 | Continuity to second output terminal 36 | Continuity to third output terminal 40 |
|---|---|---|---|---|---|---|---|---|---|
| 1 | hot | neutral | ground | closed | closed | closed | continuous | continuous | continuous |
| 2 | hot | ground | neutral | closed | closed | closed | continuous | continuous | continuous |
| 3 | neutral | hot | ground | open | open | closed | broken | broken | broken |
| 4 | neutral | ground | hot | closed | open | open | broken | broken | broken |
| 5 | ground | neutral | hot | closed | open | open | broken | broken | broken |
| 6 | ground | hot | neutral | open | open | closed | broken | broken | broken |
| 7 | open* | neutral | ground | open | closed | open | broken | broken | broken |
| 8 | open | ground | neutral | open | closed | open | broken | broken | broken |
| 9 | open | neutral | hot | open | open | open | broken | broken | broken |
| 10 | open | hot | neutral | open | open | open | broken | broken | broken |
| 11 | open | hot | ground | open | open | open | broken | broken | broken |
| 12 | open | ground | hot | open | open | open | broken | broken | broken |
| 13 | hot | open | ground | closed | closed | open | continuous | continuous | broken |
| 14 | ground | open | hot | closed | closed | open | continuous | continuous | broken |
| 15 | neutral | open | ground | open | closed | open | broken | broken | broken |
| 16 | ground | open | neutral | open | closed | open | broken | broken | broken |
| 17 | hot | open | neutral | closed | closed | open | continuous | continuous | broken |
| 18 | neutral | open | hot | closed | closed | open | continuous | continuous | broken |
| 19 | hot | neutral | open | open | closed | closed | broken | broken | broken |
| 20 | neutral | hot | open | open | closed | closed | broken | broken | broken |
| 21 | hot | ground | open | open | closed | closed | broken | broken | broken |
| 22 | ground | hot | open | open | closed | closed | broken | broken | broken |
| 23 | neutral | ground | open | open | closed | open | broken | broken | broken |
| 24 | ground | neutral | open | open | closed | open | broken | broken | broken |
| 25 | hot | open | open | open | closed | open | broken | broken | broken |
| 26 | open | hot | open | open | closed | open | broken | broken | broken |
| 27 | open | open | hot | open | closed | open | broken | broken | broken |
| 28 | open | neutral | open | open | closed | open | broken | broken | broken |
| 29 | open | open | neutral | open | closed | open | broken | broken | broken |
| 30 | neutral | open | open | open | closed | open | broken | broken | broken |
| 31 | open | open | ground | open | closed | open | broken | broken | broken |
| 32 | ground | open | open | open | closed | open | broken | broken | broken |
| 33 | open | ground | open | open | closed | open | broken | broken | broken |
| 34 | open | open | open | open | closed | open | broken | broken | broken |

*In the columns relating to the input terminals, the term "open" indicates that there is no electrical supply to this terminal. This can occur where the supply line has been omitted or has been left unconnected or there is a break in continuity in the line supplying the terminal. In the columns relating to the switches, the term "open" refers to the position state of the switch.

Table 2 shows that appliance 4 remains unprotected against electrocution hazards incident to conditions numbers 13 and 17. In each of these conditions, the putative neutral wire 18 of the electrical source 28 is open and the putative hot wire 17 of the electrical source 28 is electrically energized. Under these conditions, the output terminal 32 of the first conductive line 22 is also electrically energized while the electrical continuity between the putative ground wire 19 of the electrical source 28 and the ground wire 33 of the appliance 4 through third conductive line 26 is broken, causing the appliance 4 to be ungrounded. In these circumstances, an electrical short to the housing of the appliance 4 would present electrocution hazard to anyone who comes into simultaneous contact with the housing and an electrical ground. Although embodiments that leave one or more potential electrocution hazards unprotected against are not preferred, second electrical circuit 60 is described herein as an aid to understanding that the scope of the claims appended hereto is not limited to embodiments which provide protection against all possible electrocution hazards.

Although first and second electrical circuits 20, 60 include indicator lights, that is, first, second, and third indicator lights 48, 50, 52 and associated resistors, that is, first, second, and third resistors 54, 56, 58, it is to be understood that such indicators or other kinds of indicators, for example, electrical source 28 are among components included in some, but not all, embodiments of the present invention.

It is also to be understood that embodiments of the present invention are not limited to those which utilize sensors coils to detect miswiring of the electrical supply. Any type of electronic sensor known to those skilled in the art that is capable of detecting whether or not the electrical supply is miswired is within the contemplation of the present invention. For example, such electronic sensors include, but are not limited to, voltage sensors, current sensors, and magnetic flux sensors. Likewise, embodiments of the present invention are not limited to mechanical switches for controlling the electrical continuity between an electrical line of the electrical source and a corresponding line of the appliance. Any type of switch known to one skilled in the art is within contemplation of the present invention. For example, such switches also include, but are not limited to, semiconductor switches. Moreover, the switches may be self-resetting or require externally initiated resetting, for example, manual resetting. Additionally, it is to be understood, that there may be intermediate devices and/or electronic circuits between the sensors and the switch or switches which the sensor or sensors control. It is also to be understood that a miswiring condition may be determined by a sensor either acting alone or in combination with other sensors.

Embodiments of the present invention also include methods for preventing a miswiring condition in an electrical source from causing an appliance that is to be electrically supplied by the electrical source from being an electrocution hazard, especially where the miswiring condition causes the putative ground wire of the electrical source to be electrically energized. Such methods include the steps of detecting whether the putative ground wire of the electrical source is electrically energized and, if it is electrically energized, precluding electrical continuity between the putative ground wire of the electrical source and the ground wire of the appliance. In some embodiments, the detection of whether the putative ground wire is electrically energized involves sensing the voltage of the putative ground line of the electrical source in relation to that of at least one of the putative hot line and the putative neutral line of the electrical source to detect a miswiring condition of the electrical source. In some embodiments, the detection also includes detecting if there is a voltage difference between the putative hot and neutral lines of the electrical source. Some embodiments additionally include the steps of precluding electrical continuity between the putative hot wire of the electrical supply and the hot wire of the appliance and/or between the putative neutral wire of the electrical source and the neutral wire of the appliance. Furthermore, some embodiments include the steps of detecting if the putative ground line of the electrical source is open, and if it is detected to be open, then precluding electrical continuity between the putative hot wire of the electrical source and the hot wire of the appliance.

In addition to detecting if the putative ground wire of the electrical source is electrically energized, some embodiments also include the steps of detecting if the putative neutral wire of the electrical source is electrically energized and, if it is electrically energized, precluding electrical continuity between the putative neutral line of the electrical source and the neutral line of the appliance. In some of these embodiments, the determination of whether the putative neutral wire of the electrical source is electrically energized involves sensing the voltage of the putative neutral line of the electrical source in relation to that of at least one of the putative hot line and the putative ground line of the electrical source. Some embodiments further comprise the step of precluding electrical continuity between the putative hot line of the electrical supply and the hot line of the appliance if the putative neutral line of the appliance is detected to be electrically energized as an added precaution against any electrical power being conducted to the appliance.

Furthermore, some method embodiments include a step of displaying the wiring condition of the electrical source. For example, the displaying step may be performed by using a combination of the on-off states of a plurality of display lights, such as first, second, and third indicator lights 48, 50, 52, as depicted in FIG. 2, to display the wiring condition of the electrical source, such as electrical source 28.

Some method embodiments may be carried out by interposing a protection device 12, configured in any of the configurations illustrated in FIGS. 1A–G, between an electrical supply 28 having an electrical circuit such as first electrical circuit 20, and an appliance 4, such that the components of first electrical circuit 20 would detect a miswiring in electrical source 28 and preclude electrical continuity through one or more of first, second, and third conductive lines 22, 24, 26.

While only a few embodiments of the present invention have been shown and described, it will be obvious to those skilled in the art that many changes and modifications may be made thereunto without departing from the spirit and scope of the invention as described in the following claims.

What is claimed is:

1. An electrical continuity preclusion apparatus comprising:
   at least one sensor; and
   at least one switch in direct electrical communication with and powered by:
      (i) a putative ground line of a single-phase AC electrical source, and
      (ii) at least one other line of said singe-phase AC electrical source;
   wherein said at least one sensor detects the electrical condition of said putative ground line of said electrical source with respect to said at least one other line and causes said at least one switch to preclude electrical continuity between said putative ground line of said electrical source and the ground line of an appliance that is to be electrically supplied by said electrical source when said at least one sensor detects said putative ground line of said electrical source as being electrically energized.

2. The apparatus of claim 1, wherein said apparatus is integral to at least one of said appliance, the electrical cord of said appliance, or the electrical plug of said appliance.

3. The apparatus of claim 1, wherein said apparatus is integral to an electrical outlet.

4. The apparatus of claim 1, wherein said apparatus is an independent interface having prongs for plugging into an electrical outlet and receptacles for receiving the prongs of an electrical plug.

5. The apparatus of claim 1, wherein said at least one switch is a normally open switch.

6. The apparatus of claim 1, further comprising first and second switches, wherein said at least one sensor causes said second switch to control the electrical continuity between the putative hot line of said electrical source and the hot line of said appliance.

7. The apparatus of claim 6, further comprising a third switch, wherein said sensor causes said third switch to control the electrical continuity between the putative neutral line of said electrical source and the neutral line of said appliance.

8. The apparatus of claim 7, wherein at least one of said first, second, and third switches is a normally open switch.

9. The apparatus of claim 1, further comprising first and second sensors and a fourth switch, wherein said at least sensor causes said fourth switch to preclude electrical continuity between the putative hot line of said electrical source and the hot line of said appliance when said second sensor or said first and second sensors detect the putative ground line of said electrical source as being electrically open.

10. The apparatus of claim 9, further comprising a third sensor and a fifth switch, wherein at least one of said first, second and third sensors causes said fifth switch to preclude electrical continuity between the putative neutral line of said electrical source and the neutral line of said appliance when at least one of said first, second, and third sensors, either alone or in combination with one or more of each other, detects that the putative hot line of said electrical source as not being electrically energized and the putative neutral line of said electrical source as being electrically energized.

11. The apparatus of claim 1, further comprising an indicator of the wiring correctness of the electrical source.

12. The apparatus of claim 11, wherein said indicator comprises a plurality of display lights such that a combination of the on-off state of said display lights with each other indicates the wiring correctness of said electrical source.

13. A method for detecting an electrical miswiring condition in a single-phase AC electrical source that is to electrically supply an appliance, said method comprising steps of:
  a) placing a sensor and a switch integrated in at least a putative ground line of a single-phase AC electrical source said switch being powered by said single phase AC electrical source;
  b) detecting if the putative ground line of said electrical source is electrically energized utilizing said sensor; and
  c) precluding electrical continuity between the putative ground line of said electrical source and the ground line of said appliance with said switch if the putative ground line of said electrical source is detected as being electrically energized.

14. The method of claim 13, wherein said step of detecting includes using a first sensor to detect if the putative ground line of said electrical source is electrically energized.

15. The method of claim 14, wherein said using of said first sensor to detect if the putative ground line of said electrical source is electrically energized includes using said first sensor to sense if there is a voltage difference between the putative hot line of said electrical source and the putative ground line of said electrical source.

16. The method of claim 14, wherein said using of said first sensor to detect if the putative ground line of said electrical source is electrically energized includes using said first sensor to sense if there is a voltage difference between the putative neutral line of said electrical source and the putative ground line of said electrical source.

17. The method of claim 16, wherein said step of detecting further comprises using a second sensor to sense if there is a voltage difference between the putative hot line of said electrical source and the putative neutral line of said electrical source.

18. The method of claim 13, wherein said step of precluding electrical continuity between the putative ground line of said electrical source and the ground line of said appliance includes opening a normally-closed electrical switch between the putative ground line of said electrical source and the ground line of said appliance.

19. The method of claim 13, further comprising a step of precluding electrical continuity between the putative hot line of said electrical source and the hot line of said appliance if the putative ground line of said electrical source is detected as being electrically energized.

20. The method of claim 13, further comprising a step of precluding electrical continuity between the putative neutral line of said electrical source and the neutral line of said appliance if the putative ground line of said electrical source is detected as being electrically energized.

21. The method of claim 13, further comprising a step of displaying the wiring condition of said electrical source.

22. The method of claim 21, wherein said step of displaying includes using a combination of the on-off state of each of a plurality of display lights to display the wiring condition of said electrical source.

23. The method of claim 13, further comprising steps of:
  a) detecting if the putative neutral line of said electrical source is electrically energized; and
  b) precluding electrical continuity between the putative neutral line of said electrical source and the neutral line of said appliance if the putative neutral line of said electrical source is detected as being electrically energized.

24. The method of claim 23, wherein said step of detecting if the putative neutral line of said electrical source is electrically energized includes using a third sensor to detect if the putative neutral line of said electrical source is electrically energized.

25. The method of claim 23, further comprising a step of precluding electrical continuity between the putative hot line of said electrical source and the hot line of said appliance if the putative neutral line of said electrical source is detected as being electrically energized.

26. The method of claim 13, further comprising steps of:
  a) detecting if the putative ground of said electrical source is electrically open; and
  b) precluding electrical continuity between the putative hot line of said electrical source and the hot line of said appliance if said putative ground line of said electrical source is detected as being electrically open.

* * * * *

UNITED STATES PATENT AND TRADEMARK OFFICE
CERTIFICATE OF CORRECTION

PATENT NO. : 6,975,491 B2
APPLICATION NO. : 10/269482
DATED : December 13, 2005
INVENTOR(S) : Silverman It is certified that error appears in the above-identified patent and that said Letters Patent is hereby corrected as shown below:

Column 9, Table 1, column heading "First sensor coil switches 42a-c" should read -- First contact switches 42a-c --.

Column 9, Table 1, column heading "Second sensor coil switches 44a-c" should read -- Second contact switches 44a-c --.

Column 9, Table 1, column heading "Third sensor coil switches 46a-c" should read -- Third contact switches 46a-c --.

Signed and Sealed this

Twelfth Day of December, 2006

JON W. DUDAS
*Director of the United States Patent and Trademark Office*